United States Patent [19]

Johnson et al.

[11] Patent Number: 5,023,907
[45] Date of Patent: Jun. 11, 1991

[54] NETWORK LICENSE SERVER

[75] Inventors: Herrick J. Johnson, Marblehead, Mass.; Margaret Olson, Nashua, N.H.; Stuart Jones, Cambridge, Mass.; Stephanie Bodoff, Somerville, Mass.; Stephen C. Bertrand, Waltham, Mass.; Paul H. Levine, Carlisle, Mass.

[73] Assignee: Apollo Computer, Inc., Chelmsford, Mass.

[21] Appl. No.: 252,556

[22] Filed: Sep. 30, 1988

[51] Int. Cl.⁵ .............................................. H04L 9/00
[52] U.S. Cl. ...................................................... 380/4
[58] Field of Search ........................................... 380/4

[56] References Cited

U.S. PATENT DOCUMENTS

| | | | |
|---|---|---|---|
| 4,458,315 | 7/1984 | Uchenick | 380/4 |
| 4,573,119 | 2/1986 | Westheimer et al. | 380/4 |
| 4,593,353 | 6/1986 | Pickholtz | 380/4 |
| 4,652,990 | 3/1987 | Pailen et al. | 380/4 |
| 4,658,093 | 4/1987 | Hellman | 380/4 |
| 4,740,890 | 4/1988 | William | 380/4 |
| 4,791,565 | 12/1988 | Dunham et al. | 380/4 |
| 4,796,181 | 1/1989 | Wiedemer | 380/4 |
| 4,866,769 | 9/1989 | Karp | 380/4 |
| 4,891,838 | 1/1990 | Faber | 380/4 |

Primary Examiner—Thomas H. Tarcza
Assistant Examiner—David Cain
Attorney, Agent, or Firm—Weingarten, Schurgin, Gagnebin & Hayes

[57] ABSTRACT

A system for the management of computer programs in a computer network environment is presented. A network license server comprises a license server daemon which provides access to a computer program based on information stored in user and license databases. To track software usage, the daemon also maintains a log file which can be accessed by and interfaced with a network administration station. The network license server protects software vendors from unauthorized use of their software while permitting software programs and users to reside anywhere on the network.

26 Claims, 2 Drawing Sheets

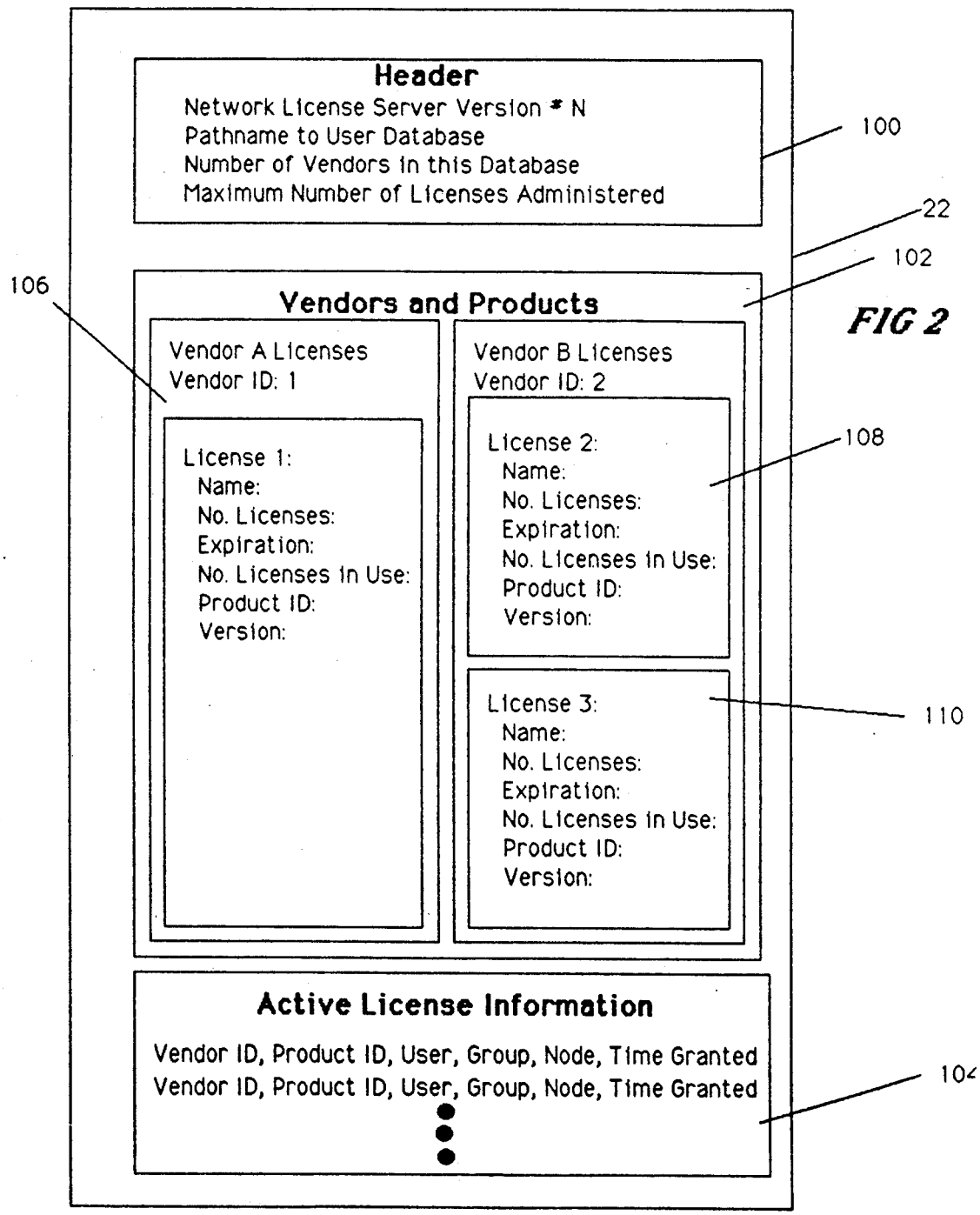

NETWORK LICENSE SERVER

FIELD OF THE INVENTION

This invention relates in general to computer systems, and more particularly, to a computer program management system for networked computers.

BACKGROUND OF THE INVENTION

A network environment for computers permits several computers or terminals to use or have access to one or more programs. Traditionally, an end user would have to obtain a license from a software vendor to authorize use of the vendor's software on terminals or workstations within the network.

One method for providing access to software is known as the single-CPU or single processor license, wherein a software program is locked to a specific CPU and access to that software is only permitted from the particular licensed computer. A single-CPU license may create instances where software is unavailable to all users because the computer is not functioning or because several users want to use the software at the same time. To assure wide access, end users frequently must obtain unneeded CPU-locked software to assure availability and convenience. Companies with but a few users of a particular software program generally choose a CPU-locked system because it is, in effect, priced proportionately to the number of users.

The second general method to provide access to software is known as site-licensing. With this method, a software program is available for all the computers at an installation. The number of users who may run a software package concurrently under a site license is theoretically limited only by the number of users in the computing environment. Although site-licensing may ease administrative and operational problems for an end user, it normally does so at a premium price which takes into account the lack of accountability that such flexible licensing provides. A site license imposes unneeded costs where only a few users of a company actually need the software.

In the instance where a software vendor offers a choice between CPU-locked and site licensed software, it is the number of expected users at a purchasing company which affects the purchasing choice. If many of the end users at a company intend to use the software, for example, then a site license may be the most appropriate distribution system because it may be the low-cost option. If the software only will be used by a few workers, however, then a CPU-locked distribution system may be more appropriate. The trade-off point is determined by the relative pricing between the two distribution systems.

For environments where many users need the software but only spend a portion of their time using it, neither a dedicated CPU-locked license nor a site license may be cost effective. In such a case, a user who needs more than a single copy of the software may not buy it, thus depriving a vendor of potential revenue. Similarly, vendors lose potential revenue when they permit a company with a very large number of users to use software over an entire site, due to a general lack of accountability.

SUMMARY OF THE INVENTION

One solution to the described problems of software distribution in a network is a network license server which comprises a license server daemon which is used to control access to software programs.

When an end user calls for a program, the license server daemon checks its associated license and user databases to determine the number of permitted accesses to the software and whether the end user, in particular, is permitted access. Based on the information provided to it, if a license is authorized, the license server daemon generates a specific signal unlocking a software "lock" which is bound to the regulated software and authorizing that user and computer to access and run the requested software. The daemon tracks software usage and distribution by writing usage events into a log file which can be accessed and controlled by a network administrator at a station using administration tools provided by the license server.

Rather than limit the value of a software package by restricting the number of machines on which it may run, the network license server permits regulation of the number of people that may use the software at any particular time. The network license server in effect controls a limited number of licenses for a particular software application, while protecting software vendors from unauthorized use of the software.

The network license server of the present invention simulates the effect of a "concurrent user license" by authorizing and controlling a specific number of accesses to a software package depending on the amount a purchaser pays to a vendor. A software vendor can, upon receipt of an additional fee, provide the purchaser with a coded number which increases the number of accesses authorized by the license server. This process permits the vendor to increase access to a licensed product without requiring the manufacture and distribution of additional software media.

DESCRIPTION OF THE DRAWINGS

The invention will be more fully understood from the following detailed description, taken in conjunction with the accompanying drawings, in which:

FIG. 2 is a graphic representation of the data stored by a license database connected to the license server.

DETAILED DESCRIPTION OF THE INVENTION

Figure 1:
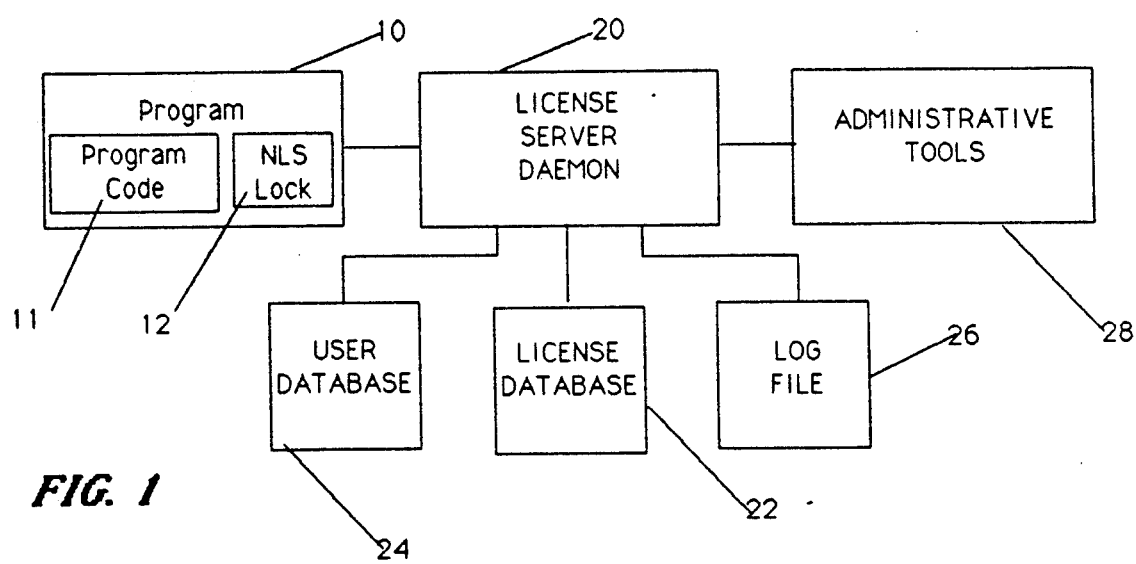
FIG. 1 is a block diagram showing a network incorporating a license server of the present invention.

With reference to FIG. 1, a network incorporating a network license server is shown. A license server daemon 20, which is a continually running software program, controls access to a software program 10 based on information stored in a license database 22 and a user database 24. The daemon 20 tracks its operations in a log file 26. The daemon 20 interfaces with a network administrator who can regulate access to the software 10 via administrative tools 28 which provide the administrator the means to add access data to the database and to refer to the log file 26.

When a software program 10 is called for from any input device such as a work station or another program in a network, the program begins to execute. It first executes a network license server (NLS) lock 12 which has been bound to the program by the program s vendor. The lock 12 prevents access to the program until the daemon 20 authorizes it to provide access. The lock 12 transmits a digital signal to the server daemon 20 which, when it receives from lock 12 the request for access to the application program 10, reviews its user database 24 and its license database 22 to determine if access can be granted. The signal the lock 12 transmits includes information relating to the user, the program, the vendor and possibly security data, such as a time stamp. Preferably, the daemon first checks its license database to determine whether a license is available and if one is, the daemon then checks its user database to determine whether the user is authorized to have access.

The license database 22 contains information relating to vendors and their products, the number of accesses permitted each product under its license, and other relevant information reflecting the terms under which the software may be accessed and operate. A typical license database 22 is graphically shown in FIG. 2. It includes a "Header" portion 100, a "Vendors and Products" portion 102, and a "License Information" portion 104.

The header portion 100 includes background information useful for operation of the license database, such as information relating to the network license server version number, a path name to the user database 24, a count of the number of vendors maintained in the database, and the maximum number of licenses administered by the database.

The vendors and products portion 102 of the license database 22 contains various information relating to the vendors, their products and their specific licenses. In the example of FIG. 2, the license database 22 is shown to manage three separate products provided by two different vendors, as shown in boxes 106, 108 and 110 respectively.

Each software product has a unique vendor identifier number. The license database 22 preferably provides at least three levels of information to define a product, by permitting vendor, product, and version identification.

License Information portion 104 of the license database 22 maintains information about licenses which are presently in use. It tracks the vendor and product identification numbers, the user, the group, the node, and the time access was granted.

A user database 24 contains the names of users or user groups who are permitted to use particular software, as specified by a site administrator. A user can be an individual, a group, or another computer program. The user database 24 can restrict and prioritorize the use of licenses. By means of this database, a network administrator can grant access to any particular product for any particular user. If user database 24 provides information authorizing a user to run a software program, and if a license remains available according to the license database 22, the server daemon 20 transmits an appropriately coded digital signal to the NLS lock 12, enabling it to give the user access to the program code 11.

If the daemon cannot provide a user access to the program because all authorized licenses are being used, the user's identification code is placed into a waiting queue maintained by the server daemon 20 until access is allowed. Then, when another user is finished with and exits from a software program 10 which has been using a license, the server daemon 20 receives a signal indicative of that fact and it "retrieves" the license by incrementing the license database 22 to reflect additional availability to the program.

In some networks, it may be preferable to provide several daemons having a fixed pro rata allocation of the grantable licenses authorized by the vendor. With such an allocation scheme, each license server daemon would control a fraction of the purchased licenses and would manage those licenses autonomously. Consequently, license servers would not need to communicate with each other regarding the disposition of their licenses, and would be immune to the effects of a network partition. However, the effects of such a division of licenses could be made invisible to users by binding a network license server program to a software package which has the responsibility for finding all available license servers and for integrating the license information they provide. This permits a user to obtain any available license throughout a network.

The license server daemon 20 is also coupled to a log file 26, which maintains a history of license server events. The log file 26 permits better management of licenses by tracking usage patterns for program applications and permitting determination of the need for more or fewer licenses. The log file can keep track of the licenses granted or released, the waiting queue, the licenses granted after a wait, the date that the license database was modified and the type of modification, and the number of requests for licenses which failed and the reasons therefore. The log file can also keep track of other information as necessary.

Administration of the network license server includes enforcement of useage policy and monitoring and logging of useage events, and is carried out by a network administrator who is a person assigned the task by the purchaser. The supplier or vendor of a software program authorizes access to its software by means of codes which are entered into the license database by means of administrative tools 28 provided for that purpose. These tools permit input into the license database of such information as the terms of the license, beginning and termination dates, and the number of licenses permitted. The tools also permit input of user authorizations into the user database, and machine identification numbers for the daemon 20 that will administer the licenses.

Because access information can be provided to an end user by telephone, security is a concern. To enhance security, a password is provided which incorporates information about the number of purchased licenses and their expiration date. The password can be made so that the enclosed information cannot be modified in a coherent way.

Security of the network license server can be protected in several other ways. To avoid the possibility that a product can be used at a neighboring site with the same password, the password can contain identification of a specific CPU from which it may be administered. The application may also contain a unique vendor code assigned to it by the license server. Also, data from the license server can be time stamped to prevent security penetration via a replay of a previously valid message.

As the number of machines or workstations in a network increases, the kinds and number of software programs to which access must be granted will correspondingly grow. The network license server can accommodate large numbers of program application transactions by using remote procedure calls as the communication mechanism. Communications systems can be used that do not consume system communications resources the entire time the licensed software is being used.

When the license database indicates that a license daemon can provide no more licenses for a particular product, the daemon may queue each new license request until an in-use license is released. To this end, each license server daemon maintains a waiting queue in its license database for each licensed product ordered in a first-in-first-out fashion. In the case where there are several license server daemons serving the same product, the user's request can be placed on the waiting queue of every license server daemon, until a license becomes available from any one of them. To avoid queued entries for which the original requestor no longer desires a license, the queueing service requires periodic renewal messages.

Because only a limited number of authorized accesses are permissible, a license obtained by a program from the license server must be retrieved by the license server if the program terminates without itself returning the license. One way to accomplish this is to use a time-out-based strategy implemented by the network license server in which the license must be "renewed" after a certain time period. Rather than assign all licenses a static time-out value, the network license server can provide a call for programs to renew the use of a currently held license and to specify the next time out period to the license server. Although the renewal interface may be called by the program at any time, it must be called within the time period specified by the previous renewal call. The network license server can periodically scan the time-last-renewed list for all outstanding licenses, and may choose to release an unrenewed license for acquisition by another user.

The network license server also permits a program to require more than one license to operate. The ability to have a program request multiple licenses allows the licensed software to weight the use of a license based on the requesting machine type. Rather than viewing the licenses as being granted one-per-user, this format permits the grant of a license per unit of program throughput. For example, if a program is run on a work station, a software vendor may decide that only one license is required. However, if the program is run on a supercomputer, the software vendor could decide that acquisition of five licenses are required.

As is apparent from the present description, other modifications and alternative implementations will occur to those versed in the art without departing from the true spirit and scope of the invention. Accordingly, it is not intended to limit the invention to what has been particularly shown and described except as indicated in the appended claims.

What is claimed:

1. A network license server comprising:
   a license database;
   a user database;
   means for generating a digital signal in response to a user's request for access to selected software, said signal being transmitted via a network to which said license server is connected;
   a license server daemon having access to said license database and said user database;
   said license server daemon operative to compare said signal generated by said means for generating a digital signal with information in said license and user databases to determine whether access to said selected software should be granted to said user; and
   means for generating a second digital signal permitting access to said selected software if access is permitted, said second digital signal being transmitted via a network to which said license server is connected.

2. The network license server of claim 1, wherein said user database includes a list of users to whom access to particular software is authorized or not authorized.

3. The network license server of claim 1, wherein said license database includes a number of accesses permitted to said selected software.

4. The network license server of claim 1, further including means for storing a record of accesses to selected software.

5. The network license server of claim 1, further including means for providing a queued list of users who have requested access to software when no license is presently available.

6. The network license server of claim 3, further including means for increasing the number of accesses permitted for said selected software.

7. A method of authorizing access to selected software in a computer network, comprising:
   employing a user database;
   employing a license database;
   employing a license server daemon with access to said user and license databases;
   employing at least on input device from which a user can select software to use;
   upon said user's request from said input device to use said software, providing to said daemon a digital signal via said computer network indicative of the identification of said user and the identification of said selected software;
   comparing a first portion of said digital signal indicative of user identification with information in said user database to determine if said user is authorized to have access to said selected software;
   comparing a second portion of said digital signal indicative of software identification with information in said license database to determine if a license is available for the use of said software; and
   providing from said daemon a second digital signal via said computer network authorizing access by said user to said software if a license is available for use the use of said software and if the user is authorized to access said software.

8. The method of claim 7, wherein said user database includes a list of users to whom access to particular software is authorized or not authorized.

9. The method of claim 7, wherein said license database includes a number of accesses permitted to particular software.

10. A method of authorizing access to selected software in a computer network, comprising;
    employing a user database;
    employing a license database;
    employing a license server daemon with access to said user and license databases;
    employing at least one input device from which a user can select software to use;
    upon said user's request from said input device to use said software, providing to said daemon a digital signal via said computer network indicative of the identification of said user and the identification of said selected software;
    comparing a first portion of said digital signal indicative of user identification with information in said user database to determine if said user is authorized to have access to said selected software and providing a first indication thereof;

comparing a second portion of said digital signal indicative of license identification with information in said license database to determine if a license is available for the use of said software and providing a second indication thereof; and providing from said daemon a second digital signal via said computer network authorizing access by said user to said software in response to positive first and second indications.

11. A network license server for use in a computer network, said server comprising:
means for storing information relating to the number of licenses available for selected software;
means for generating a signal transmitted via said network, and indicative of a user's request to access said selected software;
means for comparing said information stored in said means for storing, in response to said signal indicative of a user's request to access said selected software; and
means for providing a license to said selected software, in response to said signal indicative of a user's request to access said selected software, if the information stored in said means for storing indicates a license is available for the selected software.

12. The network license server of claim 11, further including means for determining whether access to said selected software is authorized for said user, said determining means having means for storing information indicative of authorized users for the selected software, and means for comparing said information in response to said signal indicative of a user's desire to access said selected software.

13. The network license server of claim 12, wherein said user is a computer program.

14. A method for controlling access to licensed software in the context of a computer network, comprising the steps of:
binding a program lock to said licensed software, said lock operative to preclude access to said licensed software until an authorizing signal is provided thereto;
upon a request from a user for access to said licensed software, having said program lock generate a first signal indicative of the program and requesting user;
providing said first signal via said network to a license server daemon,
providing a second signal from a license database and a third signal from a user database to said license server daemon and via said network;
using said daemon to compare a portion of said first signal with said second signal, and a portion of said first signal with said third signal, to determine whether access to said licensed program should be authorized; and
providing a fourth signal via said network to said program lock authorizing access to said licensed software if said access is to be authorized.

15. The method of claim 14, wherein a portion of said first signal is compared to said third signal only if the comparison of a portion of said first signal to said second signal indicates a license is available.

16. The network license server of claim 6, wherein said means for increasing the number of accesses permitted for said selected software includes means for receiving and utilizing a coded number, thereby increasing access to a licensed software product without requiring manufacture and distribution of additional software media.

17. The network license server of claim 1 wherein said license server daemon includes:
means for requiring more than one license to use a licensed software product, the number of licenses required being based on program throughput capability at a node.

18. The methods of claims 7 or 10 wherein said license server daemon includes:
means for requiring more than one license to use a licensed software product, the number of licenses required being based on program throughput capability at a node.

19. The network license server of claim 12 wherein said means for determining whether access to said selected software is authorized further includes:
means for requiring more than one license to use a licensed software product, the number of licenses required being based on program throughput capability at a node.

20. The network license server of claims 1 or 11 wherein said selected software is specified by a unique identifier that provides at least three levels of information to define a product, including vendor, product, and version identification.

21. The method of claims 7 or 10 further including the step of specifying said selected software by a unique identifier that provides at lest three levels of information to define a product, including vendor, product, and version identification.

22. The method of claim 14 wherein said licensed software is specified by a unique identifier that provides at least three levels of information to define a product, including vendor, product, and version identification.

23. The network license server of claim 1 wherein said license server daemon controls only a fraction of the licenses in said license database.

24. The method of claims 7, 10 or 14 wherein said license server daemon controls only a fraction of the license in said license database.

25. The network license server of claims 1 or 11, further comprising:
renewal means for providing a notification signal operative to notify a program that it must renew use of a currently held license before a time that a subsequent notification signal is provided by said means; and
scanning means for periodically scanning a list that contains information on when each license was last renewed, and for choosing to release a license for acquisition by another user when said license has not been renewed by said program prior to receiving said subsequent notification signal.

26. The method of claims 7, 10, and 14 further comprising the steps of:
providing a notification signal operative to notify a program that it must renew use of a currently held license before a time that a subsequent notification signal is provided by said means; and
periodically scanning a list that contains information on when each license was last renewed, and for choosing to release a license for acquisition by another user when said license has not been renewed by said program prior to receiving said subsequent notification signal.

* * * * *